J. P. DAVIS.

Sleigh.

No. 70,174. Patented Oct. 29, 1867.

Witnesses.

Inventor.
Jas. P. Davis

United States Patent Office.

JAMES P. DAVIS, OF STILES, WISCONSIN.

Letters Patent No. 70,174, dated October 29, 1867.

IMPROVEMENT IN BUNK FOR LOGGING-SLEIGH.

The Schedule referred to in these Letters Patent and making part of the same.

TO ALL WHOM IT MAY CONCERN:

Be it known that I, JAMES P. DAVIS, of Stiles, in the county of Oconto, and State of Wisconsin, have invented a new and improved Bunk for Logging-Sleighs; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved bunk for attachment to logging-sleighs, by the use of which the logs of the lower tier will be prevented from spreading while loading the upper tier or tiers, and which will enable the logs to be bound and unloaded in much less time than is necessary when the logs are bound in the ordinary manner; and it consists in the bunk, the ends of which are slotted vertically, and which has log-chains attached to it at or near the inner ends of the said slots, as hereinafter more fully described.

Figure 1:
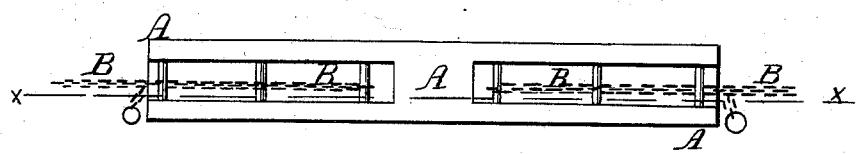
Figure 1 is a top or plan view of my improved bunk.
Figure 2:
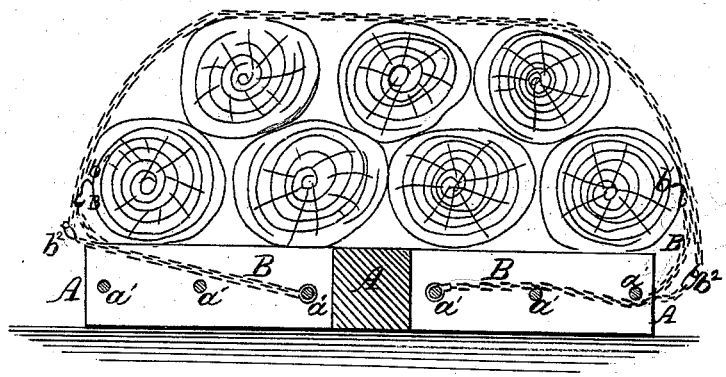
Figure 2 is a vertical longitudinal section of the same, taken through the line $x$ $x$, fig. 1.

A is the bunk, two of which are used upon the sleigh, to which they are attached in the ordinary manner. The bunks A are slotted vertically from their ends nearly to their centres, as shown in figs. 1 and 2. $a'$ are pins attached to the bunk A, and crossing the said slots to support the chains and prevent the said bunk from splitting. B are short chains, the inner ends of which are secured to the bunk A within the slots, and at or near their inner ends, as shown in figs. 1 and 2. To the outer ends of the chains B are attached, or upon them are formed, dogs $b^1$, which are driven into the sides of the outside logs to hold them in place. To the chains B, at the ends of the bunk A, are attached rings $b^2$ for convenience in attaching the log-chains by which the upper tier or tiers of logs are bound.

In using my improved bunk, the first log is rolled to the farther end of the bunks, and the dogs $b^1$ of the chains B driven into its side. The other logs of the first tier are then rolled into place, and the dogs $b^1$ of the other chains B are driven into the side of the last log, thus securing the first tier of logs in place. The logs of the upper tier or tiers are then rolled on, and the load is bound on by passing the log-chains around it, and securing them to the rings $b^2$ of the log-chains B.

I claim as new, and desire to secure by Letters Patent—

An improved logging-bunk, A, the ends of which are slotted vertically, and which has log-chains B attached to it within the said slots, and at or near their inner ends, substantially as herein shown and described, and for the purpose set forth.

JAMES P. DAVIS.

Witnesses:
   B. G. COWAN,
   J. A. KELIHER.